April 4, 1961

S. EPSTEIN 2,978,261

DOUBLE WALL VENT PIPE

Filed March 15, 1956

SAUL EPSTEIN,
INVENTOR.
Huebner, Beehler,
Worrel & Herzig.
Attorneys.

BY:

April 4, 1961 S. EPSTEIN 2,978,261
DOUBLE WALL VENT PIPE
Filed March 15, 1956 2 Sheets-Sheet 2
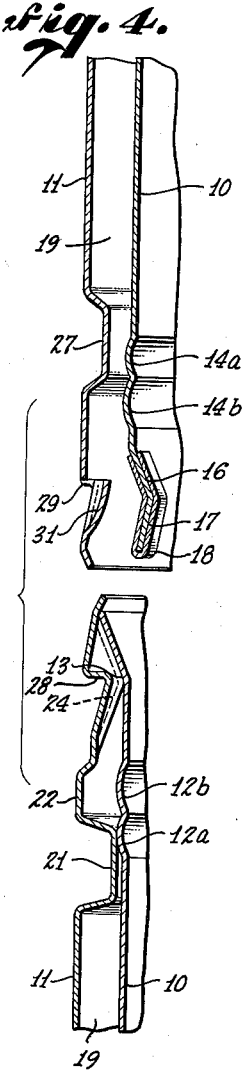
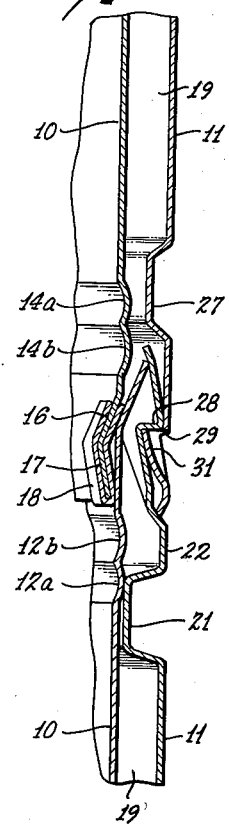
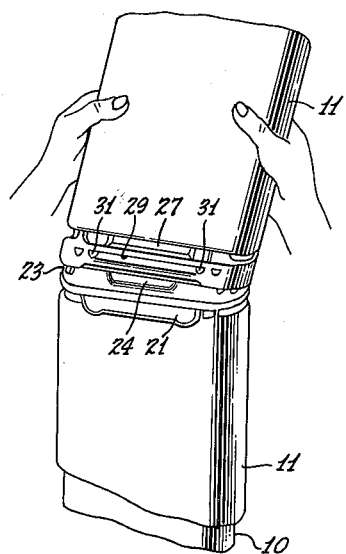
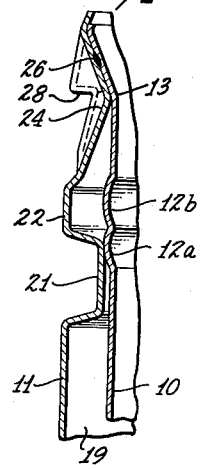
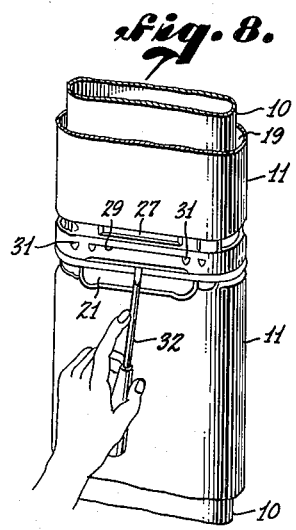
SAUL EPSTEIN,
INVENTOR.
Huebner, Beehler,
Worrel & Herzig
Attorneys.
BY: Albert M. Herzig United States Patent Office 2,978,261
Patented Apr. 4, 1961

2,978,261

DOUBLE WALL VENT PIPE

Saul Epstein, 2332 Nottingham Ave., Los Angeles 27, Calif.

Filed Mar. 15, 1956, Ser. No. 571,621

5 Claims. (Cl. 285—133)

This invention relates to an improved double wall vent pipe construction, and particularly to improved coupler construction at the ends of a section of vent pipe.

The sections of a double wall vent pipe should be designed and constructed for rapid and convenient installation without special installation methods or equipment. This, in effect, means that the male and female couplers of the vent pipe sections should be designed and constructed for rapid and convenient assembly and dis-assembly. In addition, the vent pipe sections should be light in weight, but rugged in construction, to keep manufacturing and maintenance costs at a low figure.

The inner wall of the vent pipe section should be spaced inwardly from the outer wall to form an air insulation space around the inner wall. This insulation space is desirable to effectively prevent condensation in the inner pipe in cold weather. Such double wall vent pipe sections present a difficult problem in that the male and female couplers must be designed tto prevent heat loss at the couplers which might result in condensation in the inner pipe.

At the same time, the couplers must be designed for secure, rapid and convenient assembly as well as rapid and convenient dis-assembly without the use of complicated methods and equipment. In addition, the male and female couplers must be designed for construction by the use of low cost mass production methods and tools. Furthermore, the couplers of each vent pipe section should make safe, gas-tight and leak-proof seals without the use of caulking compounds or sealing cements.

Accordingly, it is an important object of my invention to provide a rugged and durable vent pipe construction designed for rapid and efficient manufacture by the use of low cost mass production methods and machinery requiring a minimum of labor.

Another object is to provide an improved vent pipe section construction having male and female couplers that can be assembled with and dis-assembled from adjacent couplers rapidly, conveniently and efficiently without the necessity of using special installation and dis-assembly methods and tools.

A further object is to provide a vent pipe construction having light weight and low construction cost, but being adapted to prevent condensation from flue gases in cold weather, and having male and female couplers capable of making safe, gas-tight joints without the use of caulking compounds or sealing cements.

Additional objects will become apparent from the following description:

In general terms, my invention comprehends a double wall vent pipe construction having oval male coupler means on one end and oval female coupler means on the other end. The inner and outer wall of each vent pipe section preferably are fastened together only at the male coupler end and preferably are left unattached at the female coupler end and intermediate the two ends of the section. The inner and outer walls of each section are unattached to each other at the female coupler end to establish a limited floating movement of the inner wall relative to the outer wall. Relatively more flexibility is imparted to the straighter side portions than the curved end portions of the inner wall at the male coupler end of the vent pipe section and relatively more rigidity is imparted to the straighter side portions than the curved end portions at the female coupler end. This rigidity preferably is provided by the use of reinforcement strip means in a manner to prevent inward deformation of the inner wall of the vent pipe section.

For purposes of convenience in description and claiming, the term "oval" is used herein to indicate a vent pipe section having a generally ellipsoidal cross-section primarily, but it is to be understood that a true oval cross-section, a generally rectangular cross-section having rounded ends, and one having only rounded corners, also are included in the meaning of the term "oval."

A more detailed description of a specific embodiment of my invention is given with reference to the drawings, wherein:

Figure 4 is a somewhat enlarged partial sectional view showing details of the male and female couplers in a disassembled condition;

Figure 5 is a similar view showing the male and female couplers assembled to form a joint;

Figure 6 is a similar view of the male coupler showing attachment of the inner wall to the outer wall by spot welding;

Figure 7 is a partial perspective view showing a step in the assembly operation of joining a male and a female coupler; and Figure 8 is a similar view showing a step in the dis-assembly operation of separating a pair of joined male and female couplers.

Figure 1:
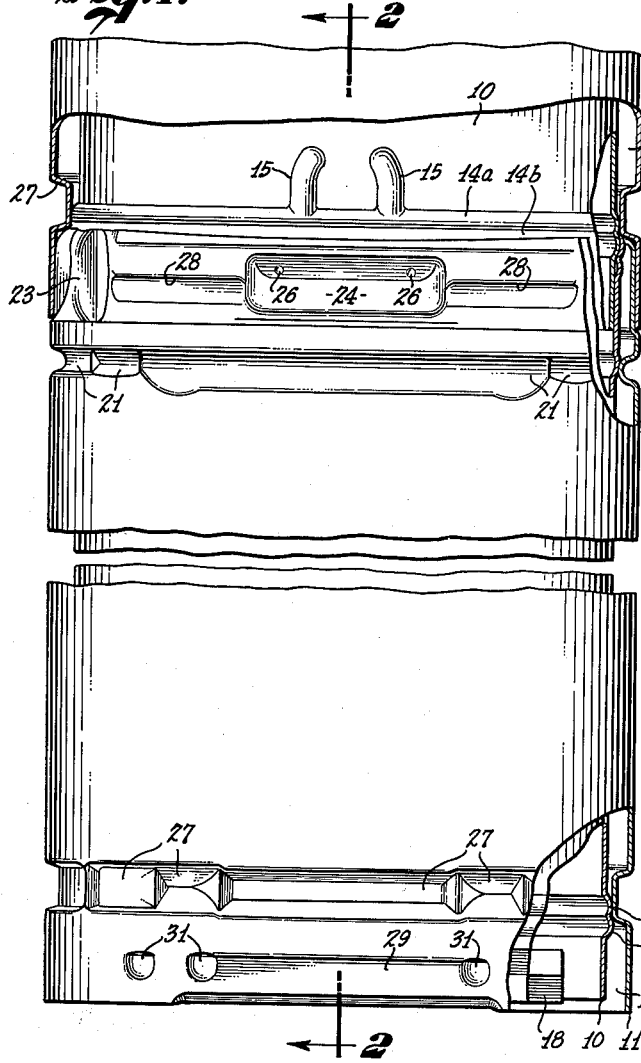
Figure 1 is a front elevational view with portions broken away showing a joint between two vent pipe sections made by a male and a female coupler.

In the specific embodiment of my invention shown in the drawings, the vent pipe sections have an "oval" cross-section. It will be understood that they can be made to have a circular, square, rectangular or other desired cross-section. In each case, the inner wall 10 and the outer wall 11 of each section has formed on opposite ends thereof a male and a female coupler member, respectively, having a generally oval outline.

The inner wall 10, between the ends thereof, preferably is made to have a uniform, smooth surface to encourage rapid, unhindered flow of flue gases through the vent pipe system. Near the male coupler end of the inner wall 10, are formed two adjacent annular beads 12a and 12b. One bead, instead of two, can be used. Outwardly of bead 12b, and adjacent thereto, are formed opposed indentations 13, transversely across the straight sides of the inner wall 10, to lend flexibility to the sides of the inner wall. Immediately adjacent the edges of the opposed sides of the inner wall 10, the inner wall is flared outwardly to join the outer wall 11 at the edges of the sides thereof.

Near the female coupler end of the inner wall 10 are formed two adjacent annular beads 14a and 14b. One bead, instead of two, can be used. Near the edge of the female coupler end, the inner wall 10, at 16, is bent inwardly transversely across the sides thereof, at an angle, and is bent outwardly at 17 to form an elongated angular indentation on each opposed side near the edges thereof, transversely of the wall 10. Strips 18 of U-shaped cross-section, having lengths substantially equal to the width of the straight portions of the inner wall 10, are folded around the edges of the female coupler end to envelop the edges, as best shown in Figures 2, 4 and 5.

In this manner, the strips 18 are secured to the edge portions 16 and 17 to strengthen and impart rigidity to these edge portions at the sides of the inner wall 10. At the sides of the inner wall 10, inward of the annular beads 14a and 14b, are formed longitudinal extensions 15, of the inner bead 14a, curving toward each other, as best indicated in Figure 1, to impart flexibility to the sides of the inner wall 10 in this region.

Figure 2:
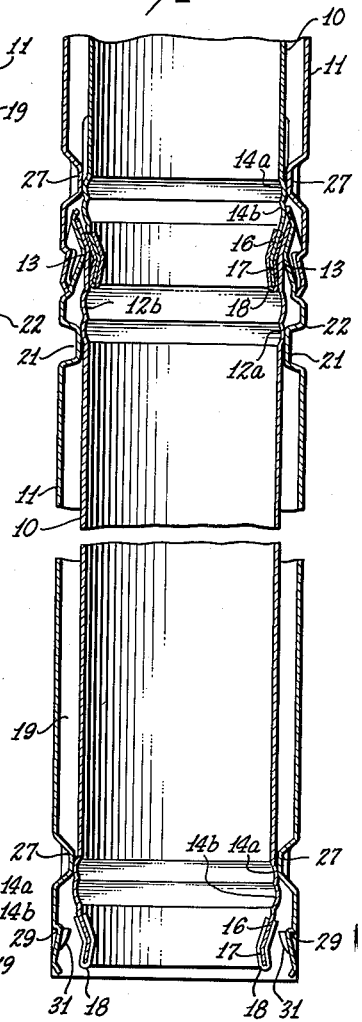
Figure 2 is a sectional elevational view taken along the line 2—2 of Figure 1 showing details of the joint and the construction of the male and female couplers.
Figure 3:
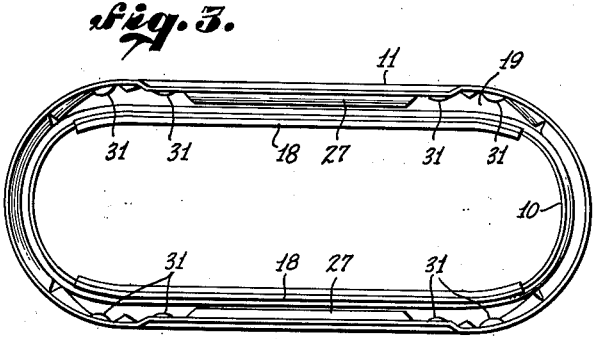
Figure 3 is a bottom view showing details of the construction of the female coupler.

The outer wall 11 also is provided with a smooth, uniform surface throughout most of its length, and is made of larger overall dimensions than the inner wall to envelop the latter and surround the latter with an insulating air space 19, as best shown in Figures 2 and 3. The insulating air space 19 serves to prevent condensation of moisture on the inner surface of inner wall 10 during cold weather. It will be seen that the inner wall 10 is well insulated and is made to possess a low thermal mass which heats up very rapidly to a condensation-preventing temperature.

Adjacent the male coupler end, the outer wall 11 is provided with a series of annularly end-to-end indentations 21, the inner surfaces of which contact the outer surface of annular bead 12a, formed on the inner wall 10, and maintain the air space 19 between the inner wall 10 and the outer wall 11. Outward of the indentations 21 is formed an annular bead 22, to increase the flexibility of the side portions, and the rigidity of the curved portions, of the outer wall 11 adjacent the male coupler end. The curved portions of the male coupler end are fluted at 23 to further strengthen these areas of the outer wall 11. The curved portions of the outer wall 11 at the male coupler end also are sloped inwardly to facilitate the insertion of the male coupler end into the female coupler when joining two adjacent vent pipe sections.

Elongated, transverse indentations 24 are formed in the straight side portions of the male coupler end so that the inside surface of the outer wall 11 at this region contacts the outside surface of the inner wall 10, as best shown in Figures 4 and 6. The inner wall 10 and outer wall 11 are tightly fastened together in this contact region by any suitable means, such as by spot welding at two points 26, on each of the sides of the male coupler end. This construction results in the formation of a relatively flexible side portion, or straight portion, at each male coupler end and a relatively stiffer region at the curved portion of each male coupler end.

The outer wall 11 is provided with a series of annularly end-to-end indentations 27 near the female coupler end, which are similar to the indentations 21 adjacent the male coupler end. The inside surfaces of indentations 27 contact the outside surface of annular bead 14a and establish air space 19 between the inner wall and outer wall, as described above.

Adjacent the male coupler end of the outer wall 11, in alignment with indentation 24 and to either side thereof, are formed transversely extending shoulders 28. On each of the straight sides of the outer wall 11, adjacent the female coupler end, are formed transverse indentations 29. To either side of the indentations 29, adjacent the curved portions of the female coupler end of the outer wall 11, are formed teeth 31. The indentations 29 and teeth 31 are positioned and adapted to tightly engage shoulders 28 when the male coupler is inserted in the female coupler to join adjacent sections of vent pipe. This engagement of teeth 31 on shoulders 28 is best shown in Figure 5.

The inner wall 10 and outer wall 11 are not attached to each other at the female coupler end or at any point between the male and female coupler ends. This results in the establishment of a limited floating movement of the inner wall 10 relative to the outer wall 11 at the female coupler end because of the flexibility of the inner wall and a slight space existing between the two walls at this end. The floating movement and flexibility of the straight portions of the inner wall 10 and outer wall 11 at the straight side portions of the female coupler end assist in the assembly of adjacent vent pipe sections by facilitating the insertion of the male coupler into the female coupler. At the same time, the curved portions of the outer wall 11 are maintained relatively rigid by the construction described above to avoid any tendency for the outer wall 11 to be deformed inwardly by inwardly directed pressures.

The stiffening strips 18, attached to the straight portions of the inner wall 10 at the female coupler end, as described above, reinforce the inner wall 10 in this region sufficiently to also avoid any tendency toward deformation of the inner wall by excessive inwardly directed pressures, but at the same time do not stiffen or rigidify the inner wall at these zones sufficiently to hinder vent pipe joint assembly and disassembly operations. Sections of the vent pipe are conveniently and rapidly assembled and disassembled without the use of special installation methods or tools.

The joint assembly operation is accomplished by placing the female coupler of one section over the male coupler of an adjacent section. One side of the female coupler section is pressed down, as shown in Figure 7, until the couplers seat to form a partial joint on that side. The other side of the female coupler section is then pressed down until the male and female couplers snaplock together to form the completed joint. It will be seen that no tools are required to assemble vent pipe sections of my invention and that the assembly method is very simple.

When it is desired to dis-assemble two joined vent pipe sections, the blade of a screw driver 32 is inserted under the side edge of the outer wall 11, the female coupler, as shown in Figure 8. The blade of the screw driver is pressed firmly inward as the screw driver is pried upwards very slowly and gently. The tip of the screw driver blade engages the male coupler in the transverse indentation 24 as the screw driver is pried upwardly. The joint between the male and female couplers slowly separates without damage as the teeth 31 and indentation 29 are caused to disengage the shoulder 28. Thus, the dis-assembly operation also is carried out without the use of elaborate tools or special dis-assembly methods.

It will be seen that a very tight, but easily assembled and dis-assembled joint, is established between adjacent sections of the vent pipe. The resulting joint is extremely gas-tight and safely leak-proof against escape of vent gases without the use of caulking compounds or sealing cements. The light weight and rugged construction of the vent pipe sections of my invention result in low unit and installation costs. Expensive support blocks are not required to support the vent pipe of my invention as distinguished from the necessity of using such expensive support blocks with the heavier prior art flues.

While I have herein shown and described my invention in what I have conceived to be the most practical and preferred embodiment, it is recognized that departures can be made therefrom within the scope of my invention, which is not to be limited to the details disclosed herein, but is to be accorded the full scope of the claims so as to embrace any and all equivalent structure.

Having described my invention, what I claim as new and desire to secure by Letters Patent is:

1. In a double wall vent pipe section generally oval in cross-section and having spaced inner and outer walls and a generally oval male coupler means on one end and a generally oval female coupler means on the other end, the improvement which comprises inner and outer walls having their opposite side walls welded together at the male coupler end, a transverse depression on the opposite sides of the outer wall and fluted patterns between said transverse depressions at the male coupler end for imparting relatively more flexibility to said opposite sides, indentations in the outer wall adjacent each end thereof for spacing the inner wall inwardly of the outer wall, said inner wall being unsecured to the outer wall at the female coupler end and at all points intermediate said male coupler end, the opposite side wall portions at the female coupler end of the inner wall being more rigid than the other wall opposed curved end portions.

2. A double wall vent pipe section according to claim 1, wherein the outer wall adjacent the male end is provided with shouldered indentations and the outer wall adjacent the female end is provided with inwardly directed teeth for engagement with the shoulders of said indentations, the indentations and the teeth being adapted to cooperate with similar teeth and indentations respectively as a part of a coupler means for joining similar pipe sections in end-to-end relationship.

3. A double wall, sheet metal, vent pipe section having spaced inner and outer walls and a male coupler means on one end, and a female coupler means on the other end, said inner and outer walls being converged together adjacent the male coupler end to present a tapered extension having a diameter smaller than the diameter of the outer wall at the female coupler end and larger than the diameter of the inner wall at the female coupler end, the outer wall at said male coupler end having elongated transverse indentations at diametrically opposed positions so that the inside surface of the outer wall at the indented regions contacts the outside surface of the inner wall, means securing said contacting surfaces together, the inner wall being otherwise free of securement to the outer wall along its length and at the female coupler end, the outer wall at said male coupler end having transversely extending shoulders adjacent each end of each of said indentations, the outer wall at said female coupler end having an elongated transverse indentation at a position corresponding to each transverse indentation on the male coupler end and having inwardly extending teeth adjacent each end of said indentation on the female coupling end adapted to snap-lock beneath the shoulders on the male coupler end of an identical vent pipe section when said pipe sections are assembled, the transverse indentations of said male and female coupler means adding rigidity to the respective wall sections containing same to facilitate the unlocking of said adjacent pipe sections by prying said indented wall sections apart, and one of said walls adjacent the coupling ends and inward from the locking means having deformations to space the inner and outer walls apart.

4. The structure of claim 3 wherein the pipe section is of noncircular cross-section having substantially straight parallel side walls and curved end walls and the said indentations and locking means are positioned in said substantially straight parallel side walls.

5. The structure of claim 4 wherein the inner substantially straight parallel side walls at the female coupler end are reinforced with stiffening strips.

References Cited in the file of this patent
UNITED STATES PATENTS

| | | |
|---|---|---|
| 724,210 | Scherer | Mar. 31, 1903 |
| 1,067,172 | Holub | July 8, 1913 |
| 1,085,303 | Scherer | Jan. 27, 1914 |
| 1,455,027 | Ludwig | May 15, 1923 |
| 1,780,232 | Hayman | Nov. 4, 1930 |
| 1,962,428 | Colbie | June 12, 1934 |
| 2,634,759 | Twickler | Apr. 14, 1953 |
| 2,650,114 | Epstein | Aug. 25, 1953 |
| 2,679,867 | Epstein | June 1, 1954 |
| 2,692,781 | Langille | Oct. 26, 1954 |
| 2,695,798 | White | Nov. 30, 1954 |